(12) United States Patent  (10) Patent No.: US 8,599,486 B2
Najiminaini et al.  (45) Date of Patent: Dec. 3, 2013

(54) THREE DIMENSIONAL SUB-WAVELENGTH STRUCTURE WITH SURFACE PLASMON ENERGY MATCHING PROPERTIES

(76) Inventors: Mohamadreza Najiminaini, London (CA); Farash Vasefi, London (CN); Bozena Kaminska, Vancouver (CA); Jeffrey John Leslie Carson, London (CA)

(*) Notice: Subject to any disclaimer, the term of this patent is extended or adjusted under 35 U.S.C. 154(b) by 31 days.

(21) Appl. No.: 13/312,766

(22) Filed: Dec. 6, 2011

(65) Prior Publication Data

US 2013/0141794 A1  Jun. 6, 2013

(51) Int. Cl.
*G02B 27/14* (2006.01)
*G02B 27/10* (2006.01)
*G02B 17/00* (2006.01)

(52) U.S. Cl.
USPC .......................... 359/634; 359/619; 359/728

(58) Field of Classification Search
USPC .......................... 359/619–634, 738
See application file for complete search history.

(56) References Cited

U.S. PATENT DOCUMENTS

| | | | |
|---|---|---|---|
| 6,052,238 A | 4/2000 | Ebbesen et al. | |
| 6,285,020 B1 | 9/2001 | Kim et al. | |
| 7,230,764 B2* | 6/2007 | Mullen et al. | 359/619 |
| 2008/0185521 A1* | 8/2008 | Hollingsworth | 250/338.1 |

OTHER PUBLICATIONS

Second-harmonic generation from an array of sub-wavelength metal apertures; M Airola, Y Liu and S. Blair; Published Jan. 20, 2005, 7 pages.

Surface plasmon subwavelength optics; William L. Barnes, Alain Dereux and Thomas W. Ebbesen; 2003 Nature Publishing Group, 7 pages, January.

Electronically controlled surface plasmon dispersion and optical transmission through metallic hole arrays using liquid crystal; Wayne Dickson, Gregory A. Wurtz, Paul R. Evans, Robert J. Pollard and Anatoly V. Zayats; Nano Letters 2008, vol. 8, No., 6 pages, January.

Optical absorption enhancement in silicon nanohole arrays for solar photovoltaics; San Eon Han and Gang Chen; 2010 American Chemical Society; Nano Letters, 4 pages, January.

Light in tiny holes; C. Genet & T.W. Ebbesen; Nature Publishing Group 2007; vol. 445, Jan. 4, 2007, 9 pages.

Plasmonic Bragg reflectors for enhanced extraordinary optical transmission through nano-hole arrays in a gold film; Pramodha Marthandam and Reuven Gordon; Oct. 1, 2007, vol. 15, No. 20, Optics Express 12995, 8 pages.

Multiscale patterning of plasmonic metamaterials; Joel Henzie, Min Hyung Lee and Teri W. Odom; Nature Nanotechnology; vol. 2, Sep. 2007, 6 pages.

(Continued)

*Primary Examiner* — Mohammed Hasan
(74) *Attorney, Agent, or Firm* — Hickman Palermo Truong Becker Bingham Wong LLP

(57) ABSTRACT

An apparatus including a three dimensional sub-wavelength structure for electromagnetic applications including a surface layer formed of a metal or semiconductor film, one or more additional layers stacked to the surface layer, one or more sub-wavelength apertures in the surface layer, and one or more cavities nearby the one or more sub-wavelength apertures. The size of each aperture is smaller than the wavelength of the electromagnetic field incident upon the three dimensional sub-wavelength structure. The one or more cavities provide accessibility for a dielectric material within and below each aperture. Each cavity may also contain at least one metal or semiconductor sub-wavelength particle. A method of fabricating a three dimensional sub-wavelength structure is also provided.

23 Claims, 10 Drawing Sheets

(56) References Cited

OTHER PUBLICATIONS

Evanescently coupled resonance in surface plasmon enhanced transmission; A. Krishnan, T. Thio, T.J. Kim, H.J. Lezec, T.W. Ebbesen, P.A. Wolff, J. Pendry, L. Martin-Moreno, F.J. Garcia-Vidal; Optics Communications 200 (2001) 7 pages, September.

Sub-micron resolution surface plasmon resonance imaging enabled by nanohole arrays with surrounding Bragg mirrors for enhanced sensitivity and isolation; Nathan C. Lindquist, Antoine Lesuffleur, Hyungsoon Im and Sang-Hyun Oh; Lab Chip 2009, 7 pages, December.

Surface-plasmon enhanced transparent electrodes in organic photovoltaics; Thomas H. Reilly III, Jao van de Lagemaat, Robert C. Tenent, Anthony J. Morfa and Kathy L. Rowlen; Applied Physics Letters 92, 243304 (2008); 2008 American Institute of Physics, 3 pages, December.

Enhanced light transmission through a single subwavelength aperture; Tineke Thio, K.M. Pellarin and R. A. Linke; Optics Letters, vol. 26, No. 24, Dec. 15, 2001; 2001 Optical Society of America, 3 pages.

Enhanced Fluorescence from Arrays of Nanoholes in a Gold Film; Alexandre G. Brolo, Shing C. Kwok, Matthew G. Moffitt, Reuven Gordon, Jason Riordon and Karen L. Kavanagh; Jacs Articles, 2005, American Chemical Society, 6 pages, September.

Extraordinary optical transmission through sub-wavelength hole arrays; T.W. Ebbesen, H.J. Lezec, H.F. Ghaemi, T. Thio & P.A. Wolff; Letters to Nature, Nature Macmillan Publishers Ltd 1998, 3 pages, September.

Light passing through subwavelength apertures; F. J. Garcia-Vidal, L. Martin-Moreno, T.W. Ebbesen, L. Kuipers; Reviews of Modern Physics, vol. 82, Jan.-Mar. 2010, 2010 The American Physical Society, 59 pages.

Strong polarization in the optical transmission through elliptical nanohole arrays; R. Gordon, A.G. Brolo, A. McKinnon, A. Rajora, B. Leathem and K.L. Kavanagh; Physical Review Letters; vol. 92, No. 3, 4 pages, January.

Resonant optical transmission through hole-arrays in metal films: physics and applications; Reuven Gordon, Alexandre G. Brolo, David Sinton and Karen L. Kavanagh; Laser & Phonton, Rev., 1-25 (2009) DOI 10.1002/Ipor.200910079, 25 pages, January.

Focusing of light by a nano-hole array; Fu Min Huang, Yifang Chen, F. Javier Garcia de Abajo and Nikolay Zheludev; Presented as post-deadline paper at the Frontiers in optics Conference 2006, Rochester, New York, USA Oct. 8-12, 2006, 9 pages.

Periodic nanohole arrays with shape-enhanced plasmon resonance as real-time biosensors; Antoine Lesuffleur, Hyungsoon Im, Nathan C. Lindquist and Sang-Hyun Oh; Applied Physics Letters 90, 243110 (2007), 2007 American Institute of Physics, 3 pages, October.

Optical transmission in perforated noble and transition metal films; F. Przybilla, A. Degiron, J-Y Laluet, C. Genet and T. W. Ebbesen; Institute of Physics Publishing; Journal of Optics A: Pure and Applied Optics; 2006, 7 pages.

Nanohole arrays in metal films as optofluidic elements: progress and potential; David Sinton, Reuven Gordon, Alexandre G. Brolo; Springer-Verag 2007, 10 pages, October.

Metallic nanohole arrays on fluoropolymer substrates as small label-free real-time bioprobes; Jiun-Chan Yang, Jin Ji, James M. Hogle and Dale N. Larson; Nano Letters, 2008 vol. 8, No. 9, 2718-2724, 7 pages, October.

Observation of coupling between surface plasmons in index-matched hole arrays; Michiel J.A. de Dood, Eduard F.C. Driessen, Daniel Stolwijk and Martin P. van Exter; Physical Review B 77, 115437 (2008), The American Physical Society, 5 pages, December.

Crucial role of the adhesion layer on the plasmonic fluorescence enhancement; Heykel Aouani, Jerome Wenger, Davy Gerard, Herve Rigneault, Eloise Davaux, Thomas W. Ebbesen, Farhad Mandavi, Tingjun Xu and Steve Blair; www.acsnano.org, vol. 3, No. 7, 2043-2048, 2009, 6 pages, December.

Fabry-Perot nanocavities in multilayered plasmonic crystals for enhanced biosensing; A. Artar, A.A. Yanik, and H. Altug; Appl. Phys. Lett. 95, 051105-3 (2009), 4 pages, December.

Characterization of a broadband all-optical ultrasound transducer—from optical and acoustical properties to imaging, Y. Hou, In-sung Kim, Sheng-wen Huang, S. Ashkenazi, L.J. Guo and M. O'Donnell; Ultrasonics, Ferroelectrics and Frequency Control, IEEE Transactions on DOI—10. 1109/TUFFC. 2008. 870 55, 1867-1877 (2008), 11 pages, December.

\* cited by examiner

FIGURE 4
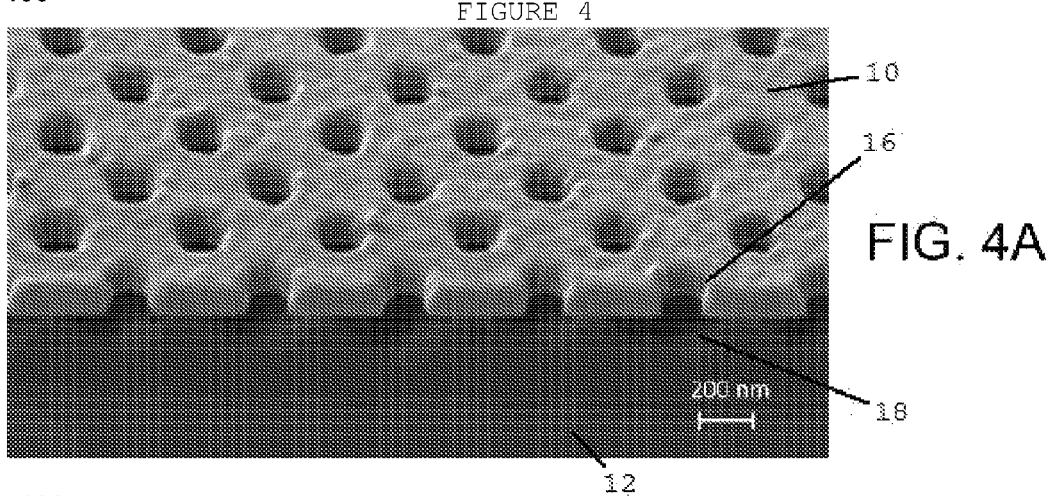
FIG. 4A
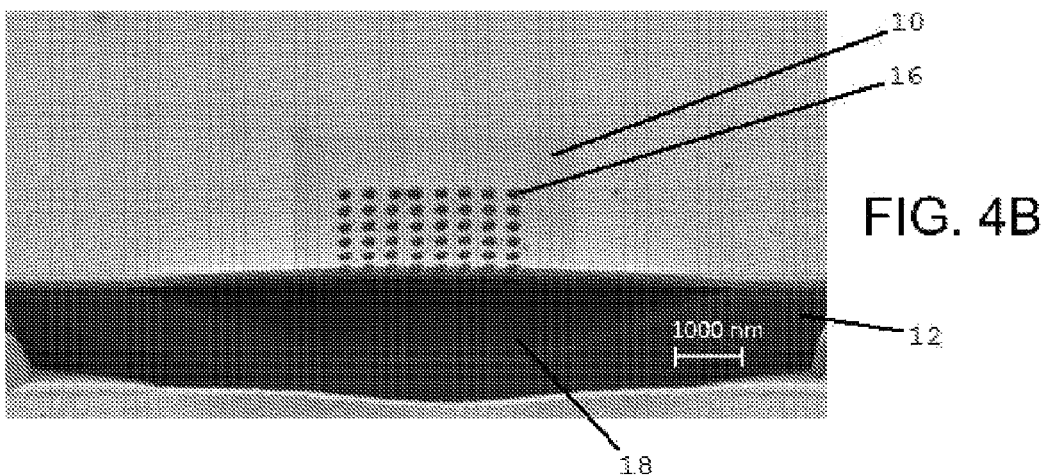
FIG. 4B
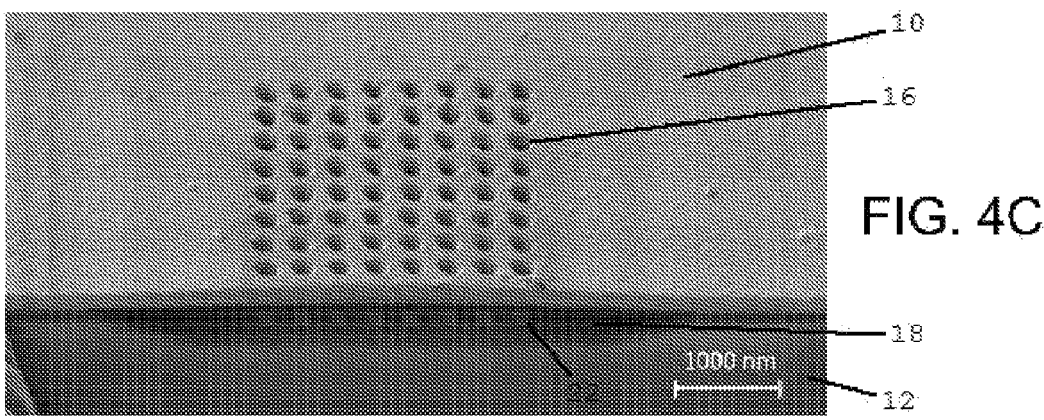
FIG. 4C

THREE DIMENSIONAL SUB-WAVELENGTH STRUCTURE WITH SURFACE PLASMON ENERGY MATCHING PROPERTIES

FIELD

Example embodiments relate to surface plasmon energy matching below and above a film such as a metal or semiconductor film.

BACKGROUND

The interaction of light with plasmonic sub-wavelength structures such as a single sub-wavelength aperture or array of sub-wavelength apertures in a metal or semiconductor film has been of interest due to the unique optical properties these structures possess. For example, Ebbesen et al. (U.S. Pat. No. 6,052,238, 18 Apr. 2000) teaches that an array of periodic sub-wavelength apertures can serve as a novel sub-diffraction optical element that has extraordinary optical transmission (EOT) properties and is capable of generating high electric near-fields in the vicinity of each aperture. Ebbesen further teaches that these phenomena happen because the array of sub-wavelength apertures permits the incident light to couple to Surface Plasmons (SP) and resonantly transfer through the sub-wavelength apertures to the other side of the metal or semiconductor film. Kim et al. (U.S. Pat. No. 6,285,020, 4 Sep. 2001) also teaches that fabrication of these devices often leads to a mismatch in the SP resonances between the top and bottom surfaces of the metal or semiconductor film due to a mismatch of the dielectric material used above and below the metal or semiconductor film. Matching of the dielectric material is possible, but this limits the selection of the dielectric to materials that can act as a structural support for the metal or semiconductor film, or to materials that have an index of refraction that is closely matched to the underlying dielectric.

Research has been performed to optimize the EOT and the electric near-field intensity of sub-wavelength aperture arrays in relation to the composition of the metal or semiconductor film, the geometry of the aperture, and the existence of structures nearby the apertures. Przybilla et al. (J. Opt. A: Pure Appl. Opt. 8, 2006) teaches that sub-wavelength aperture arrays in a noble metal have higher EOT compared to other metals. Lesuffleur et al. (J. Phys. Chem. C 111 (6), 2007) teaches that a sub-wavelength hole with a sharp apex double-hole structure produces a higher electric near-field intensity compared to two holes separated by a short distance. Gordon et al. (Opt. Express 15, 2007) teaches that Bragg reflectors consisting of corrugations surrounding the sub-wavelength hole array increase the transmission at the resonance peak due to back reflection of the SP waves within the region of the sub-wavelength aperture array.

Ebbesen et al. (Nature 391, 1998) and Krishnan et al. (Opt. Communications 200, 2001) teach that SP modes of sub-wavelength aperture arrays are dependent on the scattering orders of the apertures and dielectric properties of the materials on the top and bottom of the metal or semiconductor film. Krishnan et al. additionally teach how the optical resonance peaks related to sub-wavelength aperture arrays can be controlled by deposition of materials with a refractive index either below, equal to, or greater than the refractive index of the substrate such as Quartz. Krishnan et al. further teach that materials with the same dielectric constant in contact with the top and bottom surfaces of the aperture array in the metal film result in the coincidence of the SP resonance energies for SP modes on both surfaces of the metal film. de Dood et al. (Phys. Rev. B 77, 115437, 2008) teach how the optical transmission spectra of a sub-wavelength aperture array can be manipulated by changing the refractive index of a liquid material above the array relative to the material in contact with the underside of the array. The matching of SP resonance energies increases the EOT by a factor of 10 or more. Also, the electric near field intensity in the vicinity of the apertures will be significantly increased at the resonance wavelengths for the aperture array.

Each of these optimization methods have aimed to improve the performance of sub-wavelength hole arrays for applications such as biological and chemical sensing, Surface Enhanced Raman Spectroscopy (SERS), non-linear optics, super-lensing, optical filtering, and nanolithography.

Generally, sub-wavelength aperture arrays have been fabricated on solid substrates such as glass, quartz, Pyrex™ (Pyrex 7740 from semi wafer Inc.), polymer, SU8, or so forth due to the delicacy of the thin metal or semiconductor film. Therefore, matching of the dielectric properties of the top and bottom surface of the sub-wavelength aperture array in the metal or semiconductor film has been limited to materials with dielectric properties similar to the substrate that can be deposited on to the film. Also, each of the index matching approaches to fabrication may have one or more limitations. As Yang et al. teaches (Nano. Lett. 8, 2008), there is not always a good dielectric matching between the refractive indices of various biological solutions and the substrate of the sub-wavelength aperture array. Based on this fact, the interference of the resonance peaks with the same mode from the substrate and biological solution could result in poorer sensitivity. Furthermore, with current fabrication methodologies it is not possible to dynamically change the material below the metal or semiconductor film due to the presence of the substrate material. For example, a sub-wavelength aperture array device on a glass substrate will display resonance peaks related to the interface between the glass substrate and the metal or semiconductor film as well as the resonance peaks related to the interface between the top side material and the metal or semiconductor film. The resonance peaks from top side of sub-wavelength aperture arrays can be tuned by selecting a top side material with an appropriate refractive index. However, the resonances from the substrate side cannot be changed. Therefore, in order to match the resonances with the same mode from both the top and bottom side of a sub-wavelength aperture array, one would have to select a material with the same refractive index as the substrate for deposition on top of the sub-wavelength-hole arrays in order to gain high transmission at the resonance peaks. Also, some materials like gases such as air have a refractive index close to one and there is no suitable substrate material available with a similar refractive index. Therefore, refractive index matching may not be readily accomplished for a wide range of materials using current sub-wavelength hole array fabrication methodologies.

Other difficulties with existing systems may be appreciated in view of the detailed description herein below.

SUMMARY

In an example embodiment, there is provided an apparatus including a three dimensional (3D) sub-wavelength structure that provides for an enhanced plasmonic effect based on its geometrical properties. The structure includes a surface layer of metal or semiconductor material, at least one aperture in the surface layer that extends through both surfaces of the surface layer. One surface of the surface layer is structurally bound to a substrate layer to support the surface layer. The substrate layer includes a cavity underneath each aperture, which may extend under the edge of each aperture. The cavity with undercut provides accessibility to the space below the aperture.

In some example embodiments, the substrate layer may contain a larger cavity, which extends to two or of apertures, or all of the apertures, leaving the perforated region of surface layer as a freestanding membrane. In some example embodiments, the cavity may also contain at least one island, disk or particle of similar or different metallic or semiconductor material, which may have separate or coupled plasmonic properties to the surface layer. With the 3D sub-wavelength structure, each aperture can experience equal index of refraction above, below and within the aperture due to the existence of the cavity. The refractive index matching coverage through one or more apertures with one or more cavities provides a dynamic surface plasmon polariton or localized surface plasmon resonance plasmonic matching effects leading to enhancement of the localized electric field and enhancement of light transmission. The accessible surface of the surface layer including the cavity can be filled by a dielectric material. The dielectric material can be in the form of a solid, liquid, gas, plasma, or combination therefor.

Example embodiments of the apparatus may be utilized as a part of more complex sub-wavelength structure, which offers dynamic plasmonic energy matching. The plasmon matching effect improves the detection of changes in dielectric refractive index and provides easier control of the plasmon resonance by control over the composition of the dielectric layer and hence the index of refraction. Plasmon energy matching enhances the localized electrical field at surface layer surfaces and the optical transmission properties.

In accordance with an example embodiment, there is provided a three dimensional sub-wavelength structure with surface plasmon energy matching properties, including: a surface layer with one or more sub-wavelength apertures, one or more additional layers stacked to said surface layer, and one or more cavities functionally connected to said one or more sub-wavelength apertures and at least partly defined by said one or more additional layers.

In accordance with another example embodiment, there is provided a method for facilitating surface plasmon energy matching of a three dimensional sub-wavelength structure, The method includes receiving an incident electromagnetic field at a surface layer with one or more sub-wavelength apertures, wherein one or more additional layers are stacked to said surface layer, and surface plasmon energy matching at both surfaces of said surface layer, wherein one or more cavities are functionally connected to said one or more sub-wavelength apertures and at least partly defined by said one or more additional layers.

In accordance with another example embodiment, there is provided a method of manufacturing a three dimensional sub-wavelength structure with surface plasmon energy matching properties. The method includes: forming a surface layer with at least one sub-wavelength aperture, wherein said surface layer is stacked to one or more additional layers, and applying an etching method through said one or more sub-wavelength apertures to remove at least some of said one or more additional layers to form one or more cavities at least partly defined by said one or more additional layers.

In some example embodiments, surface plasmon resonance matching above and below the perforated metal or semiconductor film is achieved by the presence of a cavity below the film that enables the same dielectric material to be present above, below, and through each aperture. Furthermore, the dielectric material need not be relied upon as a structural support for the metal or semiconductor film and, for example, can be a solid, liquid, gas, plasma or combination thereof. Surface plasmon resonance matching increases the extraordinary optical transmission (EOT) and increases the electric near-field intensity in the vicinity of each aperture.

BRIEF DESCRIPTION OF THE DRAWINGS

Embodiments will now be described by way of example with reference to the accompanying drawings, in which like reference numerals are used to indicate similar features, and in which:

FIG. 4A shows a front perspective view of an example 3D sub-wavelength structure array obtained with a scanning electron microscope (SEM);

FIG. 4B shows a front perspective view of an example 3D sub-wavelength structure array with a plurality of apertures and a common cavity obtained with a SEM;

FIG. 4C shows a front perspective view of an example 3D sub-wavelength structure array with a plurality of apertures and a plurality of sub-wavelength particles within a cavity obtained with a SEM;

DETAILED DESCRIPTION OF EXAMPLE EMBODIMENTS

Figure 1:
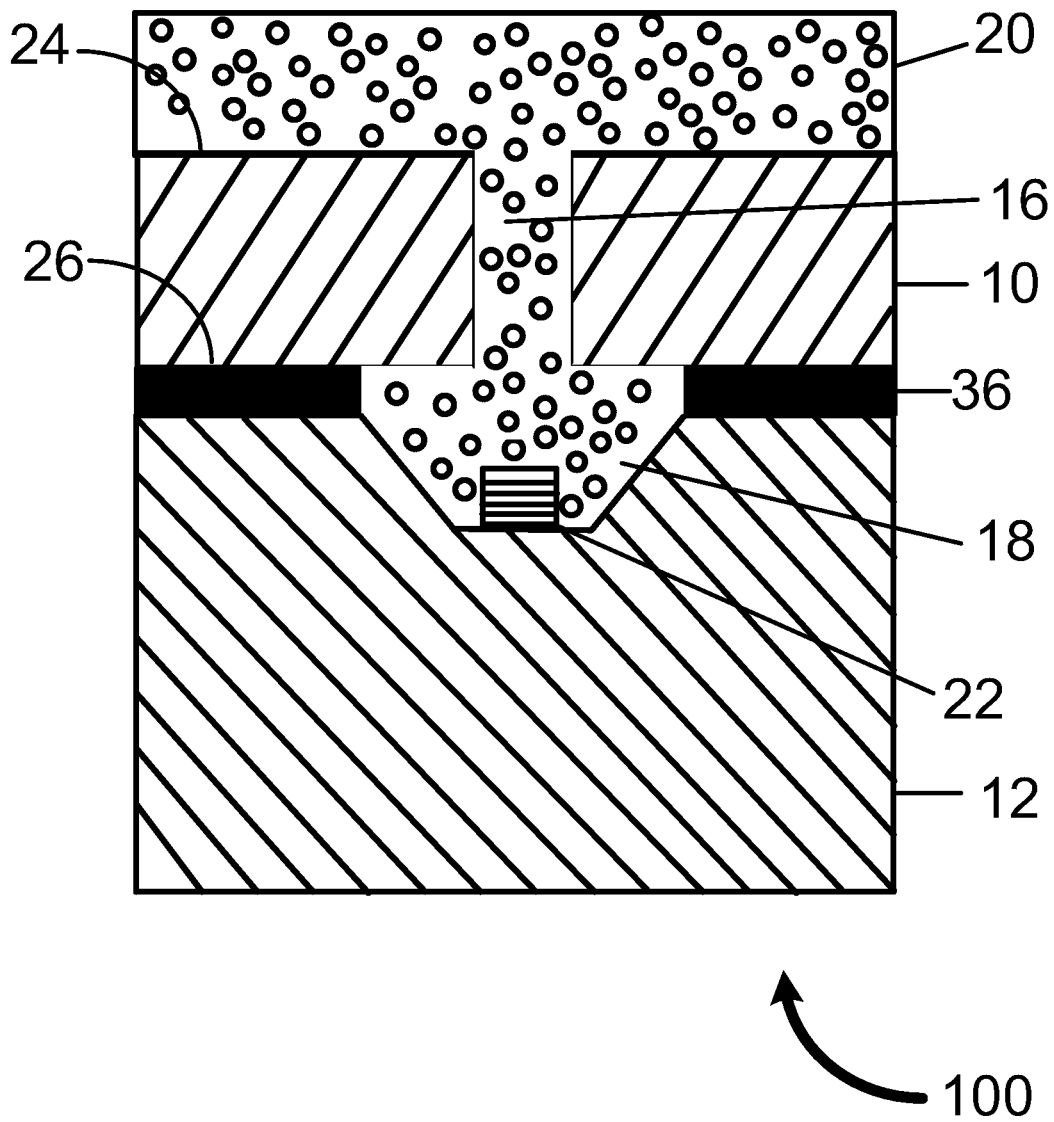
FIG. 1 shows a front sectional view of a 3D sub-wavelength structure having an aperture in accordance with an example embodiment.

Reference is now made to FIG. 1, which illustrates a 3D sub-wavelength structure 100 in accordance with an example embodiment. The 3D sub-wavelength structure 100 may, for example, comprise part of a device, apparatus, sensor, detector, or filter. The 3D sub-wavelength structure 100 is comprised of a surface layer 10 or surface layer structurally attached to a substrate layer 12. In some example embodiments, one or more additional layers 36 may include adhesion, conduction, and/or sacrificial layers which are stacked between the surface layer 10 and the substrate layer 12. The surface layer 10 includes a first surface 24 and a second surface 26, and defines an aperture 16 which extends from the first surface 24 to the second surface 26. A cavity 18 is defined within the additional layers 36 and may or may not extend into the substrate layer 12 below the aperture 16. At least part of the cavity 18 may be defined by the second surface 26. In some example embodiments, one or more sub-wavelength particles 22 may reside within the cavity 18.

In the example embodiment shown, a dielectric material 20 is present above and substantially in contact with the first surface 24 of the surface layer 10. The same dielectric material 20 may also be contained within the aperture 16 and within the cavity 18. The dielectric material 20 is also substantially in contact with the second surface 26. With this configuration, the aperture 16 can experience equal index of refraction above, below and within the aperture 16 due to the existence of the cavity 18. The refractive index matching coverage provides a dynamic plasmonic matching effect for the dielectric material 20 above, below and within the aperture 16, leading to enhancement of the localized electric field and enhancement of light transmission due to surface plasmon polariton or localized surface plasmon resonance matching effects.

In some example embodiments, suitable materials for the surface layer 10 may be any conductive material such as any metal or a doped semiconductor, and in the some example embodiments is aluminum, silver, gold, chromium, or copper. In some example embodiments, the surface layer 10 has a minimum thickness related to the skin depth (e.g. 25 nm for Au and Ag), but can extend up to many micrometers in thickness. In an exemplary embodiment the thickness is 100 nm. The aperture 16 penetrates through the surface layer 10 and may include sub-wavelength cross sectional dimensions with a nominal diameter between 10 nm to several micrometers. For the 3D sub-wavelength structure 100 usable in the visible and near infrared regions of the optical spectrum, the nominal diameter of the aperture 16 can be less than 500 nm depending on the design details and the depth is equivalent to the thickness of the surface layer 10. Furthermore, a transverse cross-section of the aperture 16 can be any shape, however in some example embodiments the aperture 16 is of circular, triangular, square, rectangular, hexagon, or elliptical shape. The surface layer 10 may also be constructed in accordance with understood methods to provide enhanced optical transmission through one or more apertures. For example, the surface layer 10 may be provided with a single aperture 16 or a plurality of periodically or sparsely arranged apertures in conjunction with a periodic surface topography such as dimples or corrugations as taught by Ebbesen in U.S. Pat. No. 6,052,238. The substrate layer 12 is made from a substantially flat material such as glass, for example Pyrex™ (e.g Pyrex 7740 from Semiconductor Wafer Inc.), but can also be a flexible polymer (e.g. SU-8 3000 from MicroChem Corporation) or a semiconductor such as silicon dioxide. The substrate layer 12 may be any substantial thickness and in some examples may be several hundred micrometers to several millimeters in the case of a Pyrex™ substrate layer 12 to centimeters or even kilometers in the case where the substrate layer 12 is an optical fiber. The cavity 18 resides beneath the surface layer 10 and represents a reservoir-like feature that is defined directly below the aperture 16. The cavity 18 may penetrate through some or all of the adhesion, conduction, and/or sacrificial layers. In some example embodiments, the cavity 18 may penetrate into the substrate layer 12 depending on the design and fabrication methodology. The cavity 18 may have a substantially spherical, pyramidal, hemispherical, cylindrical, or box-like shape. In some example embodiments, the transverse dimensions of the cavity 18 are larger, for example several times larger, than the transverse dimensions of the aperture 16. For some example embodiments designed to operate in the visible and near infrared region, the cavity 18 may be similar in the depth dimension compared to the aperture 16 size to provide partial SP matching or it may be significantly larger in order to obtain near perfect SP matching. The degree of SP energy matching depends on the geometry of the cavity 18.

In some example embodiments, a dielectric material 20 covers the upper surface of the surface layer 10, fills the aperture 16 and the cavity 18. In some example embodiments, the composition of the dielectric material 20 is selected to achieve desired optical properties of said 3D sub-wavelength structure 100. In other example embodiments, the composition of the dielectric material 20 may be unknown, but deducible using optical measurements on the device. The state of the dielectric material 20 may be a solid, liquid, gas, plasma, or combination thereof depending on the application. In some other example embodiments, an ambient gas or air may be used as the dielectric material 20, which may be independent of the manufacturing level.

In some example embodiments, the conduction layer of the additional layers 36 may be formed of a thin metal layer that facilitates fabrication of the device. For example, electron beam lithography is one of several methods useful for fabricating sub-wavelength structures and requires the deposition of a layer of conductive metal (e.g. chromium with a nominal thickness of 20 nm). For certain surface layer 10 materials, an adhesion layer may be necessary to ensure that the surface layer 10 properly adheres to the conduction layer and/or the substrate layer 12. Referring still to the additional layers 36, a sacrificial layer between the substrate layer 12 and the surface layer 10 with or without intervening conduction and/or adhesion layers may be present in some devices to create a cavity 18 with a depth similar or equal to the thickness of the sacrificial layer. Examples of sacrificial layers include chromium, titanium, and silicon nitride. Chromium and titanium may for example be used for fabrication of cavities that are on the order of 1 nm to a few micrometers thick, while the silicon nitride or polymers may for example be used for cavities that are up to 10 micrometers thick.

In some example embodiments, the sub-wavelength particle 22 can reside within the cavity 18 and can have a composition similar to the surface layer 10. For example, the sub-wavelength particle 22 may comprise a layer of metal deposited from the top-side of the device using modern deposition techniques where the aperture 16 and angle of deposition determines the size and location of the sub-wavelength particle 22, respectively. Alternatively, the sub-wavelength particle 22 may comprise a prefabricated nanosphere, nanoshell, or nanorod that is deposited into the aperture 16 or as a mixture with dielectric material 20. As shown, the sub-wavelength particle 22 may be structurally adhered to the substrate 12. In other example embodiments (not shown), the sub-wavelength particle 22 may be structurally adhered to the additional layers 36, or to other structures such as the dielectric material 20. Furthermore, the deposition process can be repeated to create a plurality of sub-wavelength particles within the cavity 18, or a plurality of prefabricated sub-wavelength particles can be deposited into the cavity 18 or be incorporated into the dielectric material 20.

Figure 2:
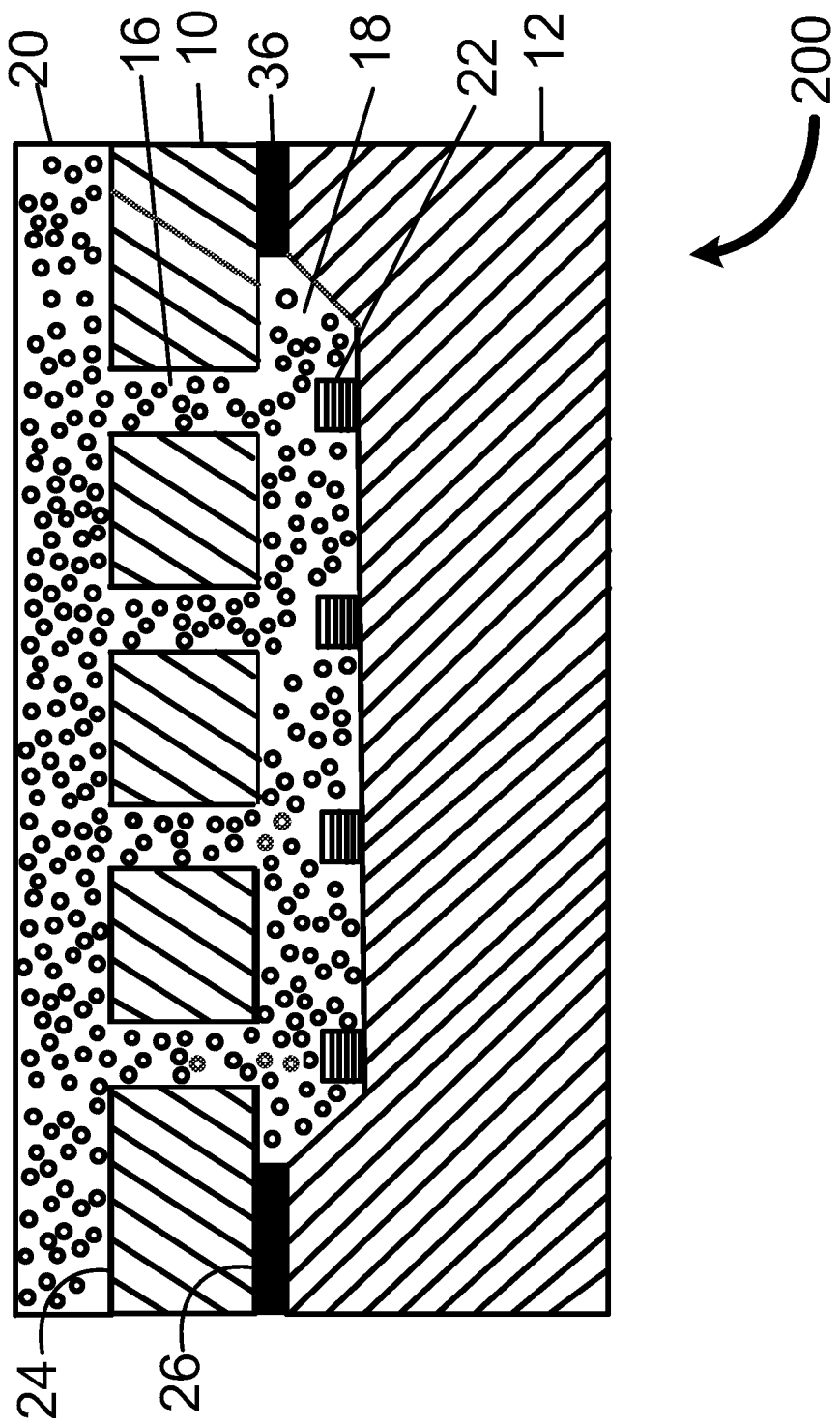
FIG. 2 shows a front sectional view of a 3D sub-wavelength structure array having a plurality of apertures and a common cavity in accordance with another example embodiment.

FIG. 2 illustrates a cross-sectional view of an example of a 3D sub-wavelength structure array 200 wherein instead of a single aperture 16 and sub-wavelength particle 22, there exists a plurality of apertures 16 in the pattern of an array and a plurality of sub-wavelength particles 22 within the cavity 18, in accordance with an example embodiment. The 3D sub-wavelength structure array 200 may, for example, comprise part of a device, apparatus, sensor, detector, or optical filter. In some example embodiments, the cavity 18 extends beneath two or more adjacent apertures 16 creating a free standing membrane comprised of the surface layer 10 and the plurality of apertures 16. In some example embodiments, the spacing between adjacent apertures 16 is between 100 nm and 2000 nm, and larger spacing in other example embodiments, wherein the apertures 16 can be arranged on a lattice or other geometric configuration such as sparse arrays. The practical number of apertures is limited only by the fabrication technique and the fragility of the device. In some example embodiments, the sub-wavelength particles 22 are arranged to be coincident with the apertures 16. One skilled in the art will appreciate that the size and shape of the apertures, the arrangement of the apertures and the number of apertures in the array is highly configurable. In addition, one skilled in the art will recognize that the shape, size, number, and arrangement of sub-wavelength particles within the cavity 18 are highly configurable.

Figure 3:
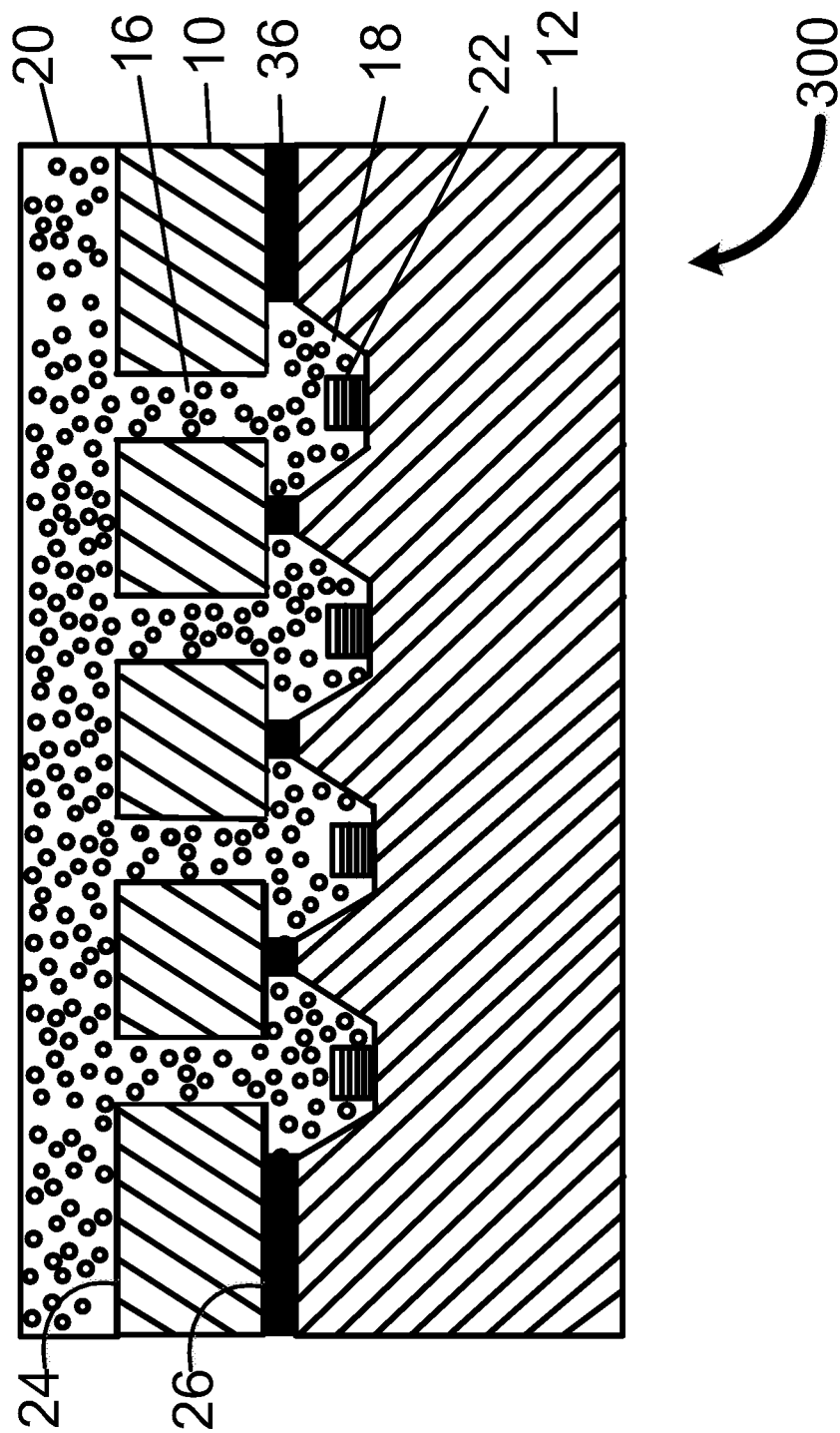
FIG. 3 shows a front sectional view of a 3D sub-wavelength structure array comprising a plurality of 3D sub-wavelength structures in accordance with another example embodiment.

FIG. 3 illustrates a cross-sectional view of a 3D sub-wavelength structure array 300, which is comprised of a plurality of 3D sub-wavelength structures, in accordance with an example embodiment. The 3D sub-wavelength structure array 300 may, for example, comprise part of a device, apparatus, sensor, detector, or filter. In the example embodiment shown, each individual 3D sub-wavelength structure may be similar to the 3D sub-wavelength structure 100 as illustrated in FIG. 1, and each 3D sub-wavelength structure may have their own separately defined cavities 18. In the example embodiment shown, the spacing between adjacent 3D sub-wavelength structures may be between 100 nm and 2000 nm, and have larger spacing in other example embodiments, and wherein the 3D sub-wavelength structures may be arranged on a square lattice. The practical number of apertures is limited only by the fabrication technique and the fragility of the device. One skilled in the art will appreciate that the type, arrangement, and number of 3D sub-wavelength structures in the array is highly configurable to achieve specific properties for the device.

Figure 8:
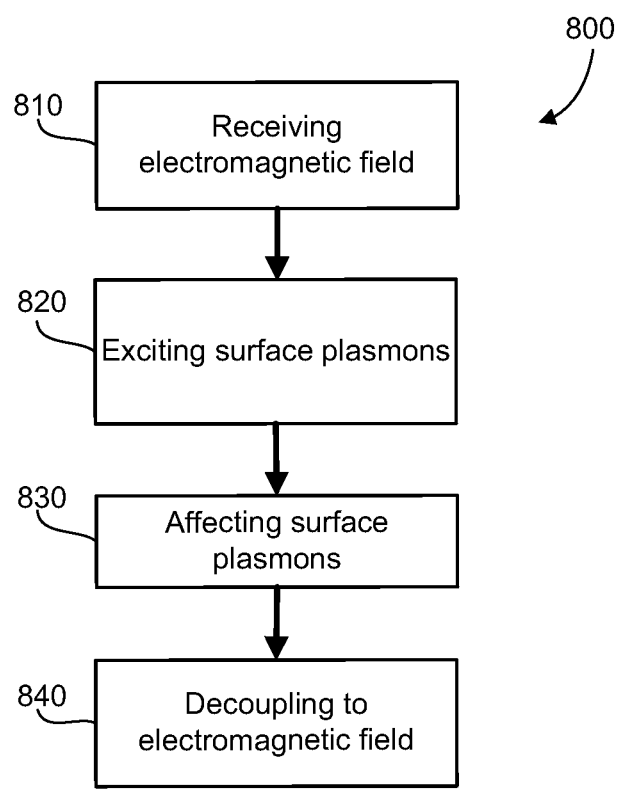
FIG. 8 illustrates a method for facilitating surface plasmon energy matching of a three dimensional sub-wavelength structure, in accordance with an example embodiment.

Reference is now made to FIG. 8, which shows a method 800 for facilitating surface plasmon energy matching of a three dimensional sub-wavelength structure (e.g. sub-wavelength structure 100 in FIG. 1), in accordance with an example embodiment. The method 800 includes receiving 810 an incident electromagnetic field at the surface layer 10. The incident electromagnetic field may be received from the direction of the first surface 24 of the surface layer 10 or from the bottom at the second surface 26. The method 800 further includes exciting 820 surface plasmons at the first surface 24 and the second surface 26 with the dielectric material 20 in contact with the first surface 24 and the second surface 26. The method 800 further includes affecting 830 the surface plasmons at the first surface 24 and the second surface 26 in contact with the dielectric material 20. This facilitates surface plasmon energy matching at the first surface 24 and the second surface 26. In some example embodiments, the affecting 830 further includes affecting surface plasmons using a sub-wavelength particle 22 located within the cavity 18. The method 800 further includes decoupling 840 the surface plasmons to the electromagnetic field. It would be appreciated that varying the angle and/or the wavelength of the incident electromagnetic field may affect the transmission characteristics. Example applications may include operating as part of a device, apparatus, sensor, detector, or filter.

FIGS. 4A to 4C show a front perspective view of examples of 3D sub-wavelength structures and 3D sub-wavelength structure arrays obtained with a scanning electron microscope (SEM) after each device was milled with a focused ion beam (FIB) to reveal the cavity and sub-wavelength particles beneath the apertures for purpose of clarity (normally the FIB process would not be applied to an operational device in such a manner).

Methods for fabrication of a 3D sub-wavelength structure and a 3D sub-wavelength structure array will now be described, in accordance with some example embodiments. In some example embodiments, electron beam lithography (EBL) is used to fabricate 200 nm diameter circular apertures in a 100-nm thick gold surface layer 10 on a glass substrate layer 12, in this case Pyrex™. For this choice of materials, proper operation of EBL required deposition of a conduction layer onto the Pyrex™ substrate layer 12 to enable focusing of the electron beam for photo-resist pattern writing. A 3-nm thick conduction layer of titanium was deposited directly onto the Pyrex™ substrate layer 12 using electron beam physical vapor deposition (EB-PVD). Then, a 500 nm photo-resist (Negative Tone photo-resist ma-N 2403, Micro Resist Technology GmbH, Berlin) was spin-coated with 1000 rpm for 40 s and soft-baked on the conduction layer for 60 sec at 90 degrees Celsius. The pattern of apertures was written using the EBL machine (LEO, 1530 e-beam lithography). Afterward, the sample was developed for 40 sec in Microposit MF 319 developer (Rohm and Haas Company, Marlborough) in order to leave behind photo-resist pillars. A 5-nm thick titanium adhesion layer was deposited onto the conduction layer using electron beam physical vapor deposition. The adhesion layer was necessary to improve the bond of the gold surface layer 10 to the substrate layer 12. Next, the 100-nm thick gold surface layer 10 was deposited on to the sample by EB-PVD. Finally, the sacrificial mask layer (photo-resist pillars) was lifted off with a photo-resist remover (Remover PG, Micro Chem Inc.) to leave behind the apertures in the gold surface layer 10.

In order to create a cavity 18 underneath each aperture 16 within the substrate layer 12 that also penetrated through both the adhesion layer and the conduction layer, isotropic wet-etching was employed. Specifically, a sample was left in an etchant (TFT, Transene company, Inc., Danvers, Mass.) for 30 seconds at 20°. The TFT etchant etched the titanium (Ti) conduction and adhesion layers as well as the Pyrex™ substrate isotropicallly underneath each aperture 16. Then, the sample was rinsed under distilled-deionized water to remove the etchant solution and clean the sample. The etching rates of TFT for titanium and Pyrex™ are 2.5 nm/s and 4.3 nm/s at 20° C., respectively. This procedure resulted in a cavity 18 underneath each aperture 16 in the 3D sub-wavelength structure array 400 as shown in FIG. 4A. Each cavity 18 was approximately 100 nm deep and 250 nm wide near the bottom surface of the surface layer 10 due to undercutting of the adhesion layer, the conduction layer, and the substrate layer 12.

FIG. 4B shows an SEM image of a 3D sub-wavelength structure 420 that was obtained after leaving a 3D sub-wavelength structure array 400 in the titanium etchant for 4 minutes. In the example shown in FIG. 4B, a large cavity 18 was formed that was 1 micrometer in depth relative to the surface layer 10 and undercut all of the apertures 16. Based on these results, one skilled in the art may recognize that the size and shape of the cavity 18 is dependent on the etchant type, the presence of adhesion, conduction, and/or sacrificial layers, the substrate layer 12 composition, and the length of time the device is permitted to remain in the etchant. In other example embodiments, other etchants and solvents may be used to form the cavity 18.

FIG. 4C shows an SEM image of a 3D sub-wavelength structure 440 with an array of apertures 16 and an array of sub-wavelength particles 22 within the cavity 18. In the example shown in FIG. 4C, EB-PVD was used to deposit a 30-nm thick gold layer onto the surface layer 10. The result was a thickening of the gold surface layer 10 and deposition of a gold sub-wavelength particle 22 directly below the aperture 16 on the bottom surface of the cavity 18. In the example shown in FIG. 4C, a large cavity 18 was formed which undercut all of the apertures 16. One skilled in the art will recognize that the size and shape of the sub-wavelength particle 22 will depend on a variety of factors, including but not limited to the aperture 16 size, aperture 16 shape, deposition thickness, angle of attack during deposition, composition of the deposition material, method of deposition, and the number of depositions.

One skilled in the art will appreciate that EBL in combination with lift-off, wet-etching and deposition procedures represents only one possible method to fabricate the 3D sub-wavelength structures and said 3D sub-wavelength structure arrays. A variety of alternative techniques are available. For example, nano-imprint lithography (NIL), interference lithography (IL), phase-shifting lithography, nano-sphere lithography, and/or focused ion beam (FIB) milling can be utilized alone, in combination, and/or with techniques already described to fabricate said 3D sub-wavelength structures and said 3D sub-wavelength structure arrays. Also, in other example embodiments other fabrication methods can be employed to fabricate the cavity 18 underneath the aperture 16 or the plurality of apertures. For example, dry-etching methods such as ion-etching and plasma etching could be combined with wet-etching for fabrication of a cavity 18 beneath each aperture 16 or array of apertures.

A flow of liquids or gasses on 3D sub-wavelength structures can fill in the cavities, the apertures, and cover the metal film. For example, a spin-coating method can be used to cover the metal film with one of a wide variety of refractive index liquids uniformly in addition of filling the cavities and the apertures. Also, a deposition method such as chemical wafer deposition (CVD) of various dielectric materials can be employed to fill in the cavity 18 and cover the metal surface.

Figure 9:
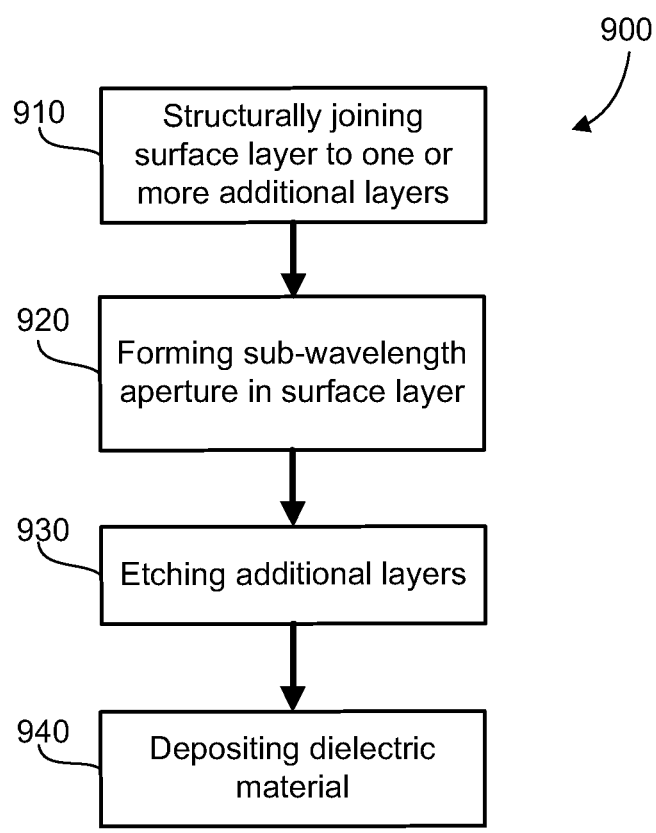
FIG. 9 illustrates a method of fabricating a three dimensional sub-wavelength structure with surface plasmon energy matching properties, in accordance with an example embodiment.

Reference is now made to FIG. 9, which illustrates a method 900 of manufacturing or fabricating a three dimensional sub-wavelength structure (e.g. sub-wavelength structure 100 in FIG. 1) with surface plasmon energy matching properties, in accordance with an example embodiment. The method 900 includes structurally joining 910 a surface layer 10 to one or more additional layers 36, 12, for example in a stack. This may include forming or layering the surface layer 10. The method 900 further includes forming 920 one or more sub-wavelength apertures 16 within said surface layer 10 which extend through said surface layer 10. The method 900 further includes etching 930 one or more additional layers 36, 12 through the one or more sub-wavelength apertures 16 to remove at least some of the one or more additional layers 36, 12 to form one or more cavities 18 at least partly defined by the one or more additional layers 36, 12. In some example embodiments, the etching 930 may include wet-etching using e.g. a solvent, or dry-etching using e.g. plasma. The method 900 may further include depositing 940 of a dielectric material onto the surface layer 10, and inserting or depositing a dielectric material 20 to fill said one or more sub-wavelength apertures 16 and said one or more cavities 18. The method 900 may also include deposition of one or more sub-wavelength particles 22 into said one or more cavities 18. The method 900 may also include formation of surface features such as grooves, corrugations and dimples within said surface layer 10 about said one or more sub-wavelength apertures 16.

Figure 5A:
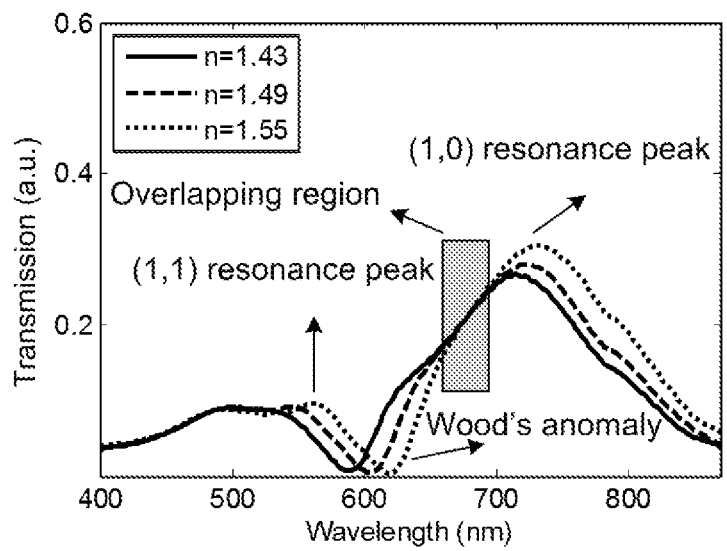
FIG. 5A illustrates optical transmission spectra for a 3D sub-wavelength structure array with a 100 nm thick gold surface layer wherein each 3D sub-wavelength structure lacked a cavity.
Figure 5B:
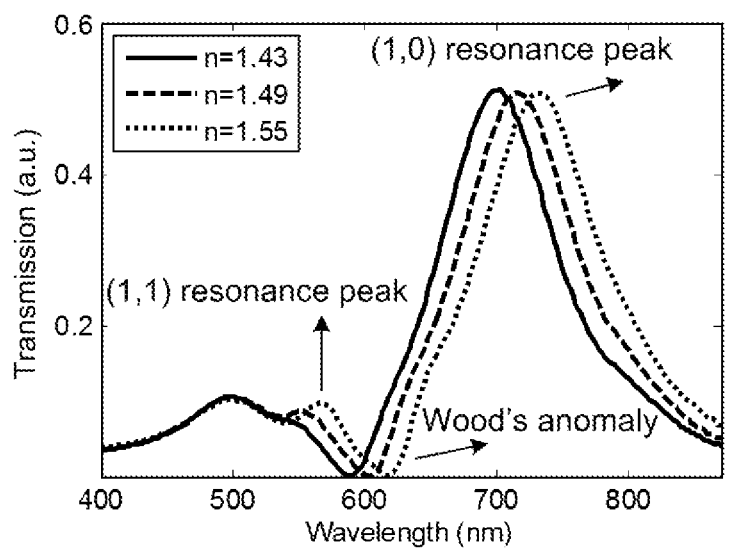
FIG. 5B illustrates a optical transmission spectra for a 3D sub-wavelength structure array with a 100 nm thick gold surface layer wherein each 3D sub-wavelength structure contained a cavity, in accordance with an example embodiment.

FIG. 5A and FIG. 5B illustrate the optical transmission spectra for a 3D sub-wavelength structure array with a 100 nm thick gold surface layer 10, where each 3D sub-wavelength structure lacked a cavity 18 (FIG. 5A) or contained a cavity 18 (FIG. 5B). The spectra illustrate how example embodiments may be applied to surface plasmon resonance (SPR) sensing, which is a sensitive technique used to detect analytes and impurities in samples during biomaterial testing, clinical testing, environmental testing, industrial testing, and many other testing applications. The spectra also demonstrate the improved performance of said 3D sub-wavelength structure array over a conventional SPR sensing device by measuring the optical changes that occur when the index of refraction of the dielectric material 20 is modified.

Shown in FIG. 5A are the optical transmission spectra obtained from a conventional device (i.e. a 3D sub-wavelength structure array lacking cavities) after a liquid dielectric material 20 having an index of refraction of 1.43, 1.49, or 1.55 was deposited onto the upper surface of the surface layer 10. For the test, the liquid dielectric material 20 was chosen to be in a range of refractive index that was close to the refractive index of the substrate layer 12 (n=1.474). This condition was utilized to present the highest SPR sensitivity that is possible with the device. Furthermore, to ensure a fair comparison between performance of each device, the experiments were performed on the same 3D sub-wavelength structure array before (FIG. 5A) and after (FIG. 5B) creation of the cavities. FIG. 5A and FIG. 5B clearly show two optical resonance peaks related to (1,0) and (1,1) SP excitation modes lambda (1,0) and lambda(1,1), respectively for each device at each test condition. For the 3D sub-wavelength structure array, the liquid dielectric materials penetrated into the apertures and the cavities resulting in the same index of refraction above, within, and below each aperture 16, which is termed index matching. Index matching results in nearly identical (1,0) resonance frequencies at the upper and lower surface of the surface layer 10 for the same SP excitation mode. The index matching capability of the 3D sub-wavelength structure array resulted in greater transmission at and nearby lambda (1,0) compared to the conventional device. Furthermore, resonance peaks related to the Pyrex™-gold side were not observed, while for the device lacking the cavities a small lambda(1,0) related to Pyrex™-gold side resulted in significant overlap in transmission spectra for the three dielectric liquids between 660 nm and 720 nm (see the rectangle in FIG. 5A). The overlap decreases SPR sensing performance dramatically as the different liquid dielectric materials are not distinguishable. However, the overlap effect is not seen with the 3D sub-wavelength structure array (see FIG. 5B), thereby demonstrating the improved performance of the 3D sub-wavelength structure array over the conventional device. For both devices, lambda(1,0) and lambda(1,1) were red-shifted for dielectric materials with higher refractive index. However, the red shifts for the 3D sub-wavelength structure array were more consistent and well separated compared to the conventional device.

Figure 6A:
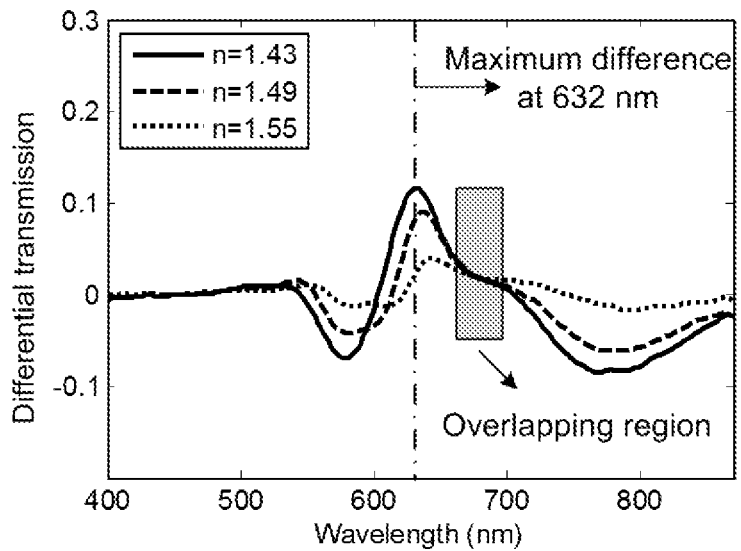
FIG. 6A illustrates a differential optical transmission spectra for a 3D sub-wavelength structure array with a 100 nm thick gold surface layer wherein each 3D sub-wavelength structure lacked a cavity.
Figure 6B:
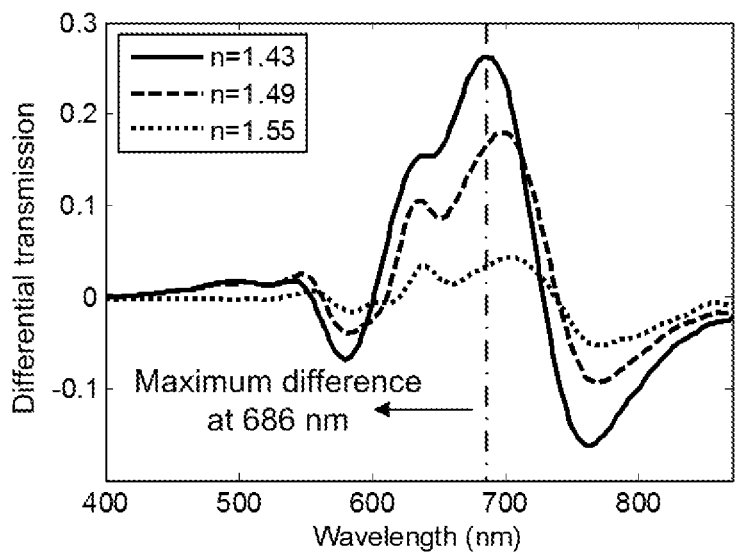
FIG. 6B illustrates a differential optical transmission spectra for a 3D sub-wavelength structure array with a 100 nm thick gold surface layer wherein each 3D sub-wavelength structure contained a cavity, in accordance with an example embodiment.

Reference is now made to FIGS. 6A and 6B, which illustrate application of the 3D sub-wavelength structure and a 3D sub-wavelength structure array for SPR sensing by presenting the data from FIG. 5A and FIG. 5B as differential transmission spectra for devices without the cavity 18 (FIG. 6A) and with the cavity 18 (FIG. 6B). Shown are the differential optical transmission spectra obtained from each 3D sub-wavelength structure array after a liquid dielectric material having an index of refraction of 1.43, 1.49, or 1.55 was deposited onto the upper surface of the surface layer. Graphing the data in this manner enables the user to select an optimal spectral band for excitation of the device with an illuminator such as a LED, laser, or optically-filtered light source; and readout of the device with a detector such as a photodiode, photomultiplier, CCD, or CMOS camera. The differential transmission spectra were computed by subtracting from the transmission spectra obtained for a 1.58 refractive index dielectric material 20 from the measured transmission spectrum of another dielectric material 20 with a refractive index as indicated in FIGS. 6A and 6B. As can be observed in FIG. 6A, as the index of refraction of the dielectric material 20 decreases the depth of the spectral valleys and height of the spectral peaks becomes larger. The largest differences in the height of the peak are most apparent at 632 nm and the differences are very small at 686 nm where an overlapping region is observed. In comparison to a 3D sub-wavelength structure array with a cavity 18 (FIG. 6B), the peak at 632 nm and the two valleys are also observed, but a much larger peak appeared at 686 nm for the identical dielectric material 20. Therefore, the 3D sub-wavelength structure array tested in FIG. 6B has a much stronger dependence on the relative change in refractive index of the dielectric material 20 compared to the device lacking the cavities (FIG. 6A). This result clearly demonstrates the use of the 3D sub-wavelength structure for SPR sensing using simple means for readout.

Figure 7A:
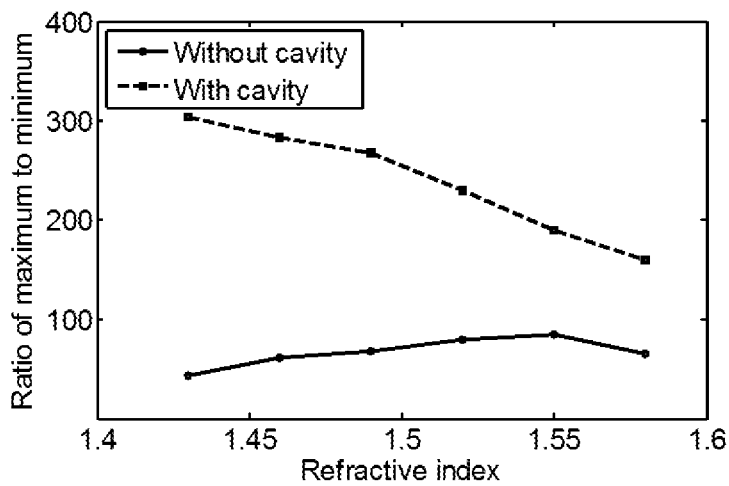
FIG. 7A illustrates a summary of measurements of dynamic range for 3D sub-wavelength structure arrays wherein 3D sub-wavelength structures within each array were fabricated with or without cavities.
Figure 7B:
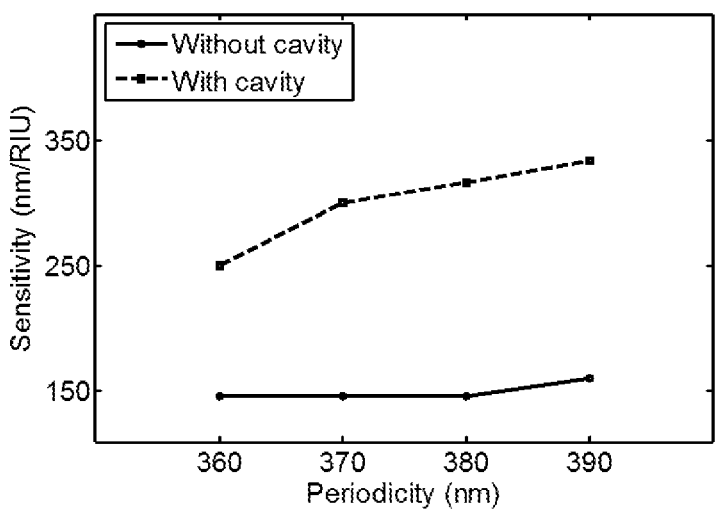
FIG. 7B illustrates a summary of measurements of sensitivity for 3D sub-wavelength structure arrays wherein 3D sub-wavelength structures within each array were fabricated with or without cavities.
Figure 7C:
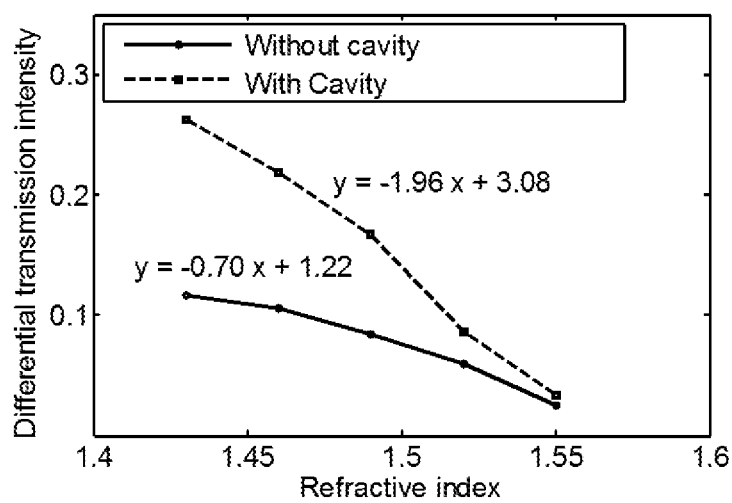
FIG. 7C illustrates a summary of measurements of differential transmission intensity for 3D sub-wavelength structure arrays wherein 3D sub-wavelength structures within each array were fabricated with or without cavities.

Reference is now made to FIGS. 7A to 7C, which further illustrate metrics derived from the optical transmission spectra for dielectric materials of a variety of refractive indices. FIG. 7A shows the dynamic range when the dielectric material had a refractive index between 1.4 and 1.6. In this example, the dynamic range is defined as the ratio of the transmission intensity between the (1,0) resonance peak (maximum) and (1,0) Wood's anomaly (minimum). FIG. 7B shows the sensitivity (nm/Refractive Index Unit (RIU)) computed from the (1,0) resonance peak for 3D sub-wavelength structure arrays each at a different aperture periodicity. FIG. 7C shows differential transmission intensity obtained from 3D sub-wavelength structure arrays when the liquid dielectric material had one of 5 values of refractive index compared to the transmission intensity when the liquid dielectric material had a refractive index of 1.58. In FIG. 7C, the 3D sub-wavelength structure arrays lacking cavities were tested in transmission mode at 632 nm and the 3D sub-wavelength structure arrays with cavities were tested in transmission mode at 686 nm.

As shown in FIG. 7A, the ratio between the lambda(1,0) resonance transmission and its corresponding transmission minimum (Wood's Anomaly) were computed for various refractive indices for both 3D sub-wavelength structure arrays with and without cavities. As can be observed from FIG. 7A, the 3D sub-wavelength structure array with cavities performed with higher dynamic range. The ratio of the peak to the minimum was quantitatively much higher for the 3D sub-wavelength structure array with cavities compared to the 3D sub-wavelength structure array without cavities. As the refractive index of the dielectric material 20 was decreased the performance improvement increased from 1.5 times at an index of 1.58 to 7 times at an index of 1.43.

FIG. 7B illustrates the sensitivity of the lambda(1,0) resonance peak for 3D sub-wavelength structures with various aperture 16 periodicities and the sensitivity was measured using dielectric materials of refractive index within the range of 1.43 to 1.58. Almost 2 times higher sensitivity was obtained for the 3D sub-wavelength structure arrays with cavities compared to the device lacking cavities. The lower sensitivity of the latter device could be due to the existence of the (1,0) resonance peak related to Pyrex™-gold side which interferes with the (1,0) resonance peak from the other side of the film (see FIG. 5A highlighted rectangle). The sensitivity of the lambda(1,0) resonance peak for 3D sub-wavelength structures arrays with cavities increases with respect to the periodicity of the apertures. However, the device lacking the cavity 18 showed almost no change in sensitivity for various periodicities except a periodicity of 390 nm. Also, a wide bandwidth of the lambda(1,0) resonance peaks reduces the sensitivity of 3D sub-wavelength structure arrays. The lower bandwidth and the sharpness of the resonance peak is very important for SPR sensing applications, as would be understood in the art, e.g. from Sinton et al. (Nanohole arrays in metal films as optofluidic elements: progress and potential. Microfluid Nanofluid 4, 107-116 (2008)). For comparison, the measured FWHM bandwidth of the 3D sub-wavelength structure arrays with cavities were 40 percent smaller than the devices lacking the cavities.

FIG. 7C illustrates the differential transmission intensity for 3D sub-wavelength structure arrays lacking the cavities at 632 nm wavelength (maximum difference) (see FIG. 6A) and 3D sub-wavelength structure arrays with cavities at 686 nm wavelength (maximum difference) (see FIG. 6B) for various refractive indexes. A linear relationship was observed for the differential transmission intensity with respect to the refractive index for 3D sub-wavelength structure arrays. However, the 3D sub-wavelength structure array with the cavities showed a higher difference with respect to the reference point (1.58 refractive index). For example, 2.3 times higher differential intensity was obtained for the 3D sub-wavelength structure array with cavities at 1.43 refractive index when compared to the 3D sub-wavelength structure array lacking cavities. Also, a large variation of differential intensity was observed for the 3D sub-wavelength structure arrays with cavities of about 2.8 times higher compared to the 3D sub-wavelength structure arrays lacking the cavities. These results illustrate that the 3D sub-wavelength structure array with cavities is an improved device for SPR sensing over the 3D sub-wavelength structure array lacking the cavities.

Figure 10A:
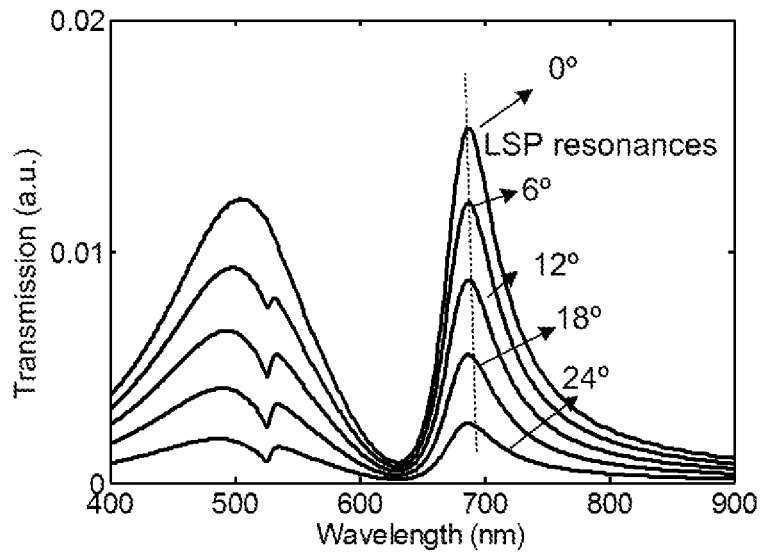
FIG. 10A illustrates the dependence of the optical transmission spectra on the illumination angle of incidence for a 3D sub-wavelength structure array with surface plasmon energy matching properties, in accordance with an example embodiment.

FIG. 10A illustrates the dependence of the optical transmission spectra for a 3D sub-wavelength structure array on the angle of incidence of illumination. In this example, the 3D sub-wavelength structure had a 100-nm thick gold surface layer and an aperture periodicity of 360 nm, wherein each 3D sub-wavelength structure consisted of a 100-nm diameter aperture and contained a 30-nm thick sub-wavelength particle at the bottom of a 50-nm deep cavity. In the Figure, the spectrum collected at each angle was scaled to facilitate clarity. For 0° no scaling was performed. For 6° the amplitude at each wavelength was multiplied by a factor of 0.8. Likewise, a multiplicative factor of 0.6, 0.4 and 0.2 was used for illumination angles of 12°, 18°, and 24°, respectively. Therefore, the five spectra were substantially overlapped in reality, but separated in the figure for clarity. In each spectrum, a broad transmission peak was observed nearby 500 nm, a broad minimum was observed nearby 620 nm, and a narrower transmission peak was observed nearby 700 nm. The transmission peak nearby 700 nm was related to surface plasmon coupling effects between each aperture and the sub-wavelength particle within each cavity. The interesting observation is related to the near independence between optical transmission and illumination angle for this example embodiment. This is in contrast to similar devices lacking the cavity and the sub-wavelength particle, where the optical transmission tends to depend greatly on illumination angle. The angle independent property of the example embodiment may have applications in a variety of areas where sensitivity to illumination angle is to be avoided, such as in optical filtering and efficient collection and transmission of light. A specific example of the latter relates to the collection of light by solar cells for conversion to electricity, where the tracking of the solar cell can be minimized or avoided due to the angle insensitive transmission properties of the example embodiment. Artar et al. (Appl. Phys. Lett., 2009) teaches that Fabry-Perot (FP) transmission resonances can be generated for structures with sub-wavelength holes and sub-wavelength particles on a solid substrate. Therefore, a 3D sub-wavelength structure with cavity and sub-wavelength particles at the bottom of the cavity can be designed in such a way that it forms resonance transmissions related to the FP effect in the cavity between the hole and particle. The ability to incorporate FP effects into the 3D sub-wavelength structure with cavity and sub-wavelength particles at the bottom of the cavity may have several applications related to sensing. For example, Hou et al. (IEEE Trans. Ultrason. Ferroelectr. Freq. Control., v55(8), 2008) teaches how the FP effect can be used to improve the detection of pressure waves using an all optical pressure sensor. The 3D sub-wavelength structure with cavity and sub-wavelength particles at the bottom of the cavity could provide for improved pressure sensing and more versatile readout. For example, the device could be constructed in a manner such that the transmission resonance is dependent on location within the device, hence an array of pressure sensors, where each element comprised a 3D sub-wavelength structure with cavity and sub-wavelength particles at the bottom of the cavity could be readout using spectroscopic techniques, which would enable simultaneous detection on each element of the array.

Figure 10B:
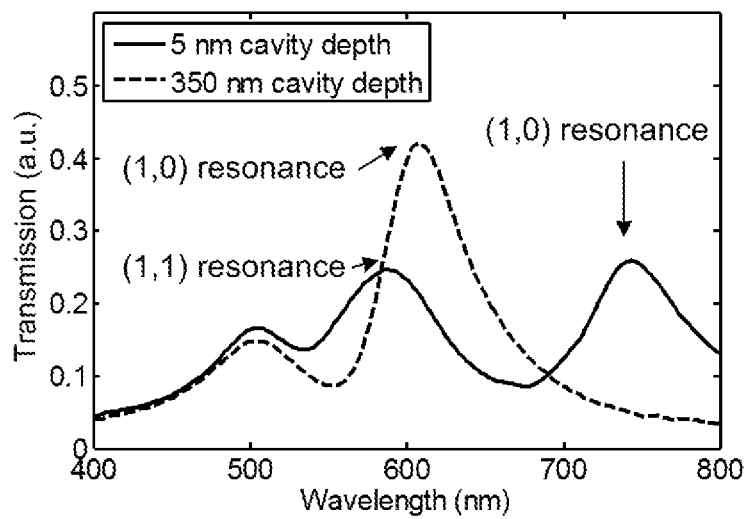
FIG. 10B illustrates the dependence of the optical transmission spectra on the cavity depth for a 3D sub-wavelength structure array without and with surface plasmon energy matching properties, in accordance with an example embodiment.

FIG. 10B illustrates the dependence of the optical transmission spectra for a 3D sub-wavelength structure array on the cavity depth. In this example, the 3D sub-wavelength structure has a 70-nm free-standing gold surface layer with 120-nm diameter apertures at a periodicity of 400 nm. Shown are the transmission spectra when the cavity below the array of apertures had a depth of 5 nm and 350 nm. The 3D sub-wavelength structure array with 5-nm cavity depth had two optical resonance peaks ($\lambda$sub (1,0) and $\lambda$sub (1,1)), which were related to the (1,0) and (1,1) surface plasmon modes of the substrate-gold side. However, the 3D sub-wavelength structure array with a 350-nm cavity depth had only one resonance peak ($\lambda(1,0)$) due to coincidence of the surface plasmon modes on both sides of the gold film. No resonance peaks related to the free-gold side ($\lambda$free(modes)) for either 3D sub-wavelength structure array were observed. Based on computation of the surface plasmon propagation length into the dielectric (e.g. air or Pyrex) perpendicular to the metal film, the 3D sub-wavelength structure array with the 350-nm cavity depth had SP energy matching between the top and bottom of the metal film. Coincidence of the surface plasmon modes for the 3D sub-wavelength structure array with the 350-nm cavity depth resulted in enhanced transmission at resonance and a significant blue-shift of the resonance position with respect to the 3D sub-wavelength structure array with the 5-nm cavity depth. The blue-shift in $\lambda(1,0)$ was simply due to the lower refractive index of air (n=1) relative to the Pyrex substrate (n=1.474). Also, the $\lambda(1,1)$ for the 3D sub-wavelength structure array with 350-nm cavity depth was not observed due to its occurrence above the bulk plasmon frequency of gold (at $\lambda$=500 nm), where no coupling can occur. Therefore, the optical transmission spectra of 3D sub-wavelength structure array can be significantly changed based on the cavity depth.

One skilled in the art may recognize that the array of said 3D sub-wavelength structures may be replicated and arranged to form a mosaic of 3D sub-wavelength structures of almost any conceivable pattern, where the geometric properties of each 3D sub-wavelength structure can be identical, unique, or a combination thereof.

One skilled in the art may recognize that the array of said 3D sub-wavelength structure arrays may be replicated and arranged to form a mosaic of 3D sub-wavelength structures of almost any conceivable pattern, where the geometric properties of each 3D sub-wavelength structure array can be identical, unique, or a combination thereof.

One skilled in the art may recognize that reference to a layer as described herein may include one or more layers, depending on the particular application. One skilled in the art may recognize that a single layer may perform a same function as multiple layers, depending on the particular application.

One skilled in the art may recognize that reference to the performance benefits of the 3D sub-wavelength structures and arrays of such structures can be obtained by illumination incident on the second surface of the surface layer.

One skilled in the art may recognize that the SP energy matching properties of the 3D subwavelength structures and array of such structures can be obtained in the mid-infrared, far-infrared, terahertz, microwave, and radio frequency regime.

In some example embodiments, the geometrical shape of each aperture may be defined depending on the particular application. The shape of the apertures within the structures can have any arbitrary shape including but not specifically limited to at least one of circular, triangular, quasi-triangular, square, rectangular, hexagonal, elliptical, rectangular with a semi-circles or triangles with rounded corner at both ends along either long or short axis, rectangular with four rounded corners, and combinations of overlapping or separated shapes.

In some example embodiments, the fabrication method may be used to make various sub-wavelength apertures distributed on a periodic or non-periodic lattice with any transverse shape such as square, rectangular, circular, elliptical, and so on, of arrays on a specific substrate or various substrates. These sub-wavelength structures could be either isolated islands or connected to one another by a large underlying cavity. In some example embodiments, one cavity may be functionally connected to two or more of the apertures.

In some example embodiments, the 3D sub-wavelength structures may be used as an optical polarizer with improved optical transmission properties by forming apertures of asymmetrical shape or asymmetrical lattice arrangement. The aperture can be in the format of a slit, which has transmission and reflection properties that are dependent on the polarization of the incoming light. For example, the orientation of the polarization must be substantially similar to the orientation of the slits to achieve maximal transmission intensity. The shape-effect of the elliptical and rectangular apertures can be used to optimize the polarization dependence of the resonant transmission. The lattice arrangement can also make the transmitted light sensitive to polarization direction because the surface waves are scattered at the aperture in the direction of the electric field of the incident plane wave.

In some example embodiments, the 3D sub-wavelength structures may be used as an optical spectral filter by including a dielectric layer with a specific refractive index thereby enhancing transmission at one or more spectral bands and reducing transmission at other spectral bands. The spatial patterning of the dielectric can be used to make a variety of spatially resolved filters such as a mosaic filters for camera applications, hyperspectral imaging and spectroscopy applications, and patterning of surfaces for marking and security applications.

In some example embodiments, the 3D sub-wavelength structures may be used as an electrically controlled optical filter by electrically biasing an electrically sensitive dielectric layer, such as a liquid crystal. Electrical biasing results in a change in the effective refractive index and thereby modifies the optical transmission and reflection properties of the device.

In some example embodiments, the 3D sub-wavelength structures maybe used as a magnetically-controlled optical filter by magnetically biasing a magnetically sensitive dielectric layer. Magnetic biasing results in a change in the effective refractive index and thereby modifies the optical transmission and reflection properties of the device.

In some example embodiments, the 3D sub-wavelength structures may be used as a thermally-controlled optical filter by thermally biasing a temperature sensitive dielectric material. Temperature biasing results in a change in the effective refractive index and thereby modifies the optical transmission and reflection properties of the device.

In some example embodiments, the 3D sub-wavelength structures may be used as a pressure-controlled optical filter by pressurizing a pressure sensitive dielectric material. Pressurization results in a change in the effective refractive index and thereby modifies the optical transmission and reflection properties of the device.

In some example embodiments, the 3D sub-wavelength structures may be used as pressure sensors by suitable choice of dielectric material and deposition of the dielectric material. In these example embodiments, the deflection of the surface layer 10 in response to static pressure or a time-varying pressure wave results in a change in the optical signal detectable through transmission or reflection measurements.

In some example embodiments, the 3D sub-wavelength structures may be used as a sensor for electric field, magnetic field, temperature, pressure, and or sound waves using a suitably selected material as the dielectric material. The optical transmission and reflection properties of the device will change in response to the external field or stimulus and can be read out using optical means.

In some example embodiments, the 3D sub-wavelength structures may be used as an optically-triggered, optical switch by deposition of an optically active material, such as a photoisomer.

In some example embodiments, the 3D sub-wavelength structures may be used as an active substrate in surface plasmon resonance sensing. The specific dependence of surface plasmon resonance on the refractive index of the dielectric suggests that the structures are proper platforms for chemical sensing by immobilizing a target chemical and monitoring the changes in the resonance upon adsorption of the molecule of interest to the target as a dielectric layer. Other example applications include Near-field Scanning Optical Microscopy (NSOM), nanolithography, nonlinear optics, and super lensing.

In some example embodiments, the 3D sub-wavelength structures may be used as an active substrate in surface enhanced Raman sensing. Higher Raman scattering signals will be achieved compared to conventional substrates due to the higher localized electric fields due to the surface plasmon energy matching effect.

In some example embodiments, the 3D sub-wavelength structures may be used as an active substrate in fluorescence enhanced sensing. Example embodiments of the 3D sub-wavelength structures can enhance the intrinsic or extrinsic fluorescence of the molecules when they are placed in the proximity of the sub-wavelength structures due to the localized electrical field enhancement effect due to surface plasmon energy matching.

In some example embodiments, the 3D sub-wavelength structures may be used as a sensor for application in microfluidics.

It may further be appreciated that some example embodiments may utilize a wide variety of materials in different states (solid, gas, liquid, plasma, or combination thereof) as the index-matching medium. This advantage is facilitated by the cavity below each sub-wavelength aperture, which enables the index-matching medium to be present above, below and within the aperture or plurality of apertures.

It may further be appreciated that some example embodiments may provide improved sensitivity to the presence of materials nearby or in contact with the aperture or plurality of apertures. Increased optical transmission and narrower bandwidth at the surface plasmon resonance wavelengths may be provided for structures containing one or more apertures within a metal or semiconductor film.

Certain adaptations and modifications of the described embodiments can be made. Therefore, the above discussed embodiments are considered to be illustrative and not restrictive. Example embodiments described as methods would similarly apply to systems, and vice-versa.

Variations may be made to some example embodiments, which may include combinations and sub-combinations of any of the above. The various embodiments presented above are merely examples and are in no way meant to limit the scope of this disclosure. Variations of the innovations described herein will be apparent to persons of ordinary skill in the art, such variations being within the intended scope of the present disclosure. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present disclosure as a whole. The subject matter described herein intends to cover and embrace all suitable changes in technology.

What is claimed is:

1. A three dimensional sub-wavelength structure with surface plasmon energy matching properties, comprising:
   a surface layer with one or more sub-wavelength apertures;
   one or more additional layers stacked to said surface layer; and
   one or more cavities functionally connected to said one or more sub-wavelength apertures and at least partly defined by said one or more additional layers, wherein one of said one or more cavities is etched to be functionally connected to two or more of the sub-wavelength apertures.

2. The three dimensional sub-wavelength structure as claimed in claim 1, further comprising a dielectric material at both surfaces of said surface layer and at least partly within said one or more cavities.

3. The three dimensional sub-wavelength structure as claimed in claim 2, wherein said dielectric material is in the form of a solid, liquid, gas, plasma, or combination thereof.

4. The three dimensional sub-wavelength structure as claimed in claim 2, wherein said dielectric material contains one or more sub-wavelength particles located within said one or more cavities.

5. The three dimensional sub-wavelength structure as claimed in claim 1, wherein said surface layer comprises a metal or semiconductor film.

6. The three dimensional sub-wavelength structure as claimed in claim 1, further comprising:
   one or more sub-wavelength particles, located within said one or more cavities.

7. The three dimensional sub-wavelength structure as claimed in claim 6, wherein said one or more sub-wavelength particles are comprised of a same or different material as said surface layer.

8. The three dimensional sub-wavelength structure as claimed in claim 1, wherein said one or more additional layers includes a substrate layer, for support.

9. The three dimensional sub-wavelength structure as claimed in claim 1, wherein said one or more additional layers include one or more sacrificial layers, conduction layers, and/or adhesion layers.

10. The three dimensional sub-wavelength structure as claimed in claim 1, wherein at least one of said one or more sub-wavelength apertures extends through said surface layer.

11. The three dimensional sub-wavelength structure as claimed in claim 1, wherein a transverse dimension of said one or more cavities is larger than a transverse dimension of said one or more sub-wavelength apertures.

12. A method for facilitating surface plasmon energy matching of a three dimensional sub-wavelength structure including a surface layer with one or more sub-wavelength apertures, wherein one or more additional layers are stacked to said surface layer, comprising:
   applying an etching method to remove at least some of said one or more additional layers to form one or more cavities at least partly defined by said one or more additional layers, wherein the etching method includes etching one of said one or more cavities to be functionally connected to two or more of the sub-wavelength apertures;
   receiving an incident electromagnetic field at the surface layer; and
   surface plasmon energy matching at both surfaces of said surface layer.

13. The method as claimed in claim 12, wherein said surface plasmon energy matching is affected by one or more sub-wavelength particles located within said one or more cavities.

14. The method as claimed in claim 13, wherein said one or more sub-wavelength particles are comprised of a same or different material as said surface layer.

15. The method as claimed in claim 12, wherein a dielectric material is at said both surfaces of the surface layer and at least partly contained within said one or more cavities, wherein the dielectric material is in the form of a solid, liquid, gas, plasma, or combination thereof.

16. The method as claimed in claim 12, wherein said surface layer comprises a metal or semiconductor film.

17. The method as claimed in claim 12, wherein said one or more additional layers includes a substrate layer, for support.

18. The method as claimed in claim 12, wherein at least one of said one or more sub-wavelength apertures extends through the surface layer.

19. A method of manufacturing a three dimensional sub-wavelength structure with surface plasmon energy matching properties, comprising:
   forming a surface layer with at least one sub-wavelength aperture, wherein said surface layer is stacked to one or more additional layers; and
   applying an etching method through said one or more sub-wavelength apertures to remove at least some of said one or more additional layers to form one or more cavities at least partly defined by said one or more additional layers,
   wherein the etching method includes etching one of said one or more cavities to be functionally connected to two or more of the sub-wavelength apertures.

20. The method as claimed in claim 19, further comprising inserting a dielectric material to fill said sub-wavelength aperture and said one or more cavities.

21. The method as claimed in claim 19, further comprising depositing of one or more sub-wavelength particles into said one or more cavities.

22. The method as claimed in claim 19, wherein said depositing of said one or more sub-wavelength particles includes varying an angle of depositing to affect properties or location of said one or more sub-wavelength particles.

23. The method as claimed in claim 19, wherein said one or more additional layers includes a substrate layer, for support.

* * * * *